United States Patent [19]

Modic

[11] Patent Number: 5,175,212
[45] Date of Patent: Dec. 29, 1992

[54] LOW TEMPERATURE TOUGHENING OF POLYCARBONATES WITH A MODIFIED BLOCK COPOLYMER

[75] Inventor: Michael J. Modic, Richmond, Tex.

[73] Assignee: Shell Oil Company, Houston, Tex.

[21] Appl. No.: 787,448

[22] Filed: Nov. 4, 1991

[51] Int. Cl.⁵ .................... C08L 69/00; C08L 51/04; C08F 287/00
[52] U.S. Cl. ........................ 525/67; 525/92; 525/303
[58] Field of Search ............. 525/67, 92, 303

[56] References Cited

U.S. PATENT DOCUMENTS

| | | | |
|---|---|---|---|
| Re. 27,145 | 6/1971 | Jones | 260/880 |
| 4,033,888 | 7/1977 | Kiovsky | 252/56 D |
| 4,077,893 | 3/1978 | Kiovsky | 252/56 R |
| 4,427,828 | 1/1984 | Hergenrother et al. | 525/66 |
| 4,537,930 | 8/1985 | Bussink | 525/92 |
| 4,578,429 | 3/1986 | Gergen et al. | 525/291 |
| 4,628,072 | 12/1986 | Shiraki et al. | 525/57 |
| 4,670,173 | 6/1987 | Hayashi et al. | 252/51.5 |
| 4,866,125 | 9/1989 | Lo | 525/67 |

FOREIGN PATENT DOCUMENTS

| | | | |
|---|---|---|---|
| 062350 | 3/1989 | Japan | 525/67 |
| 282256 | 11/1989 | Japan . | |

*Primary Examiner*—David J. Buttner
*Attorney, Agent, or Firm*—Keith M. Tackett

[57] ABSTRACT

Toughened polycarbonate compositions are obtained by blending from 2 to 10 parts by weight of a modified block copolymer with from 90 to 98 parts by weight of a polycarbonate. The modified block copolymers have at least one hydrogenated conjugated diene block and at least one vinyl aromatic block, and are free-radically grafted with an effective amount of hydroxyethylacrylate to give a ⅛ inch notched Izod impact strength of greater than 4.0 ft-lb/in at −40° F.

10 Claims, No Drawings

LOW TEMPERATURE TOUGHENING OF POLYCARBONATES WITH A MODIFIED BLOCK COPOLYMER

FIELD OF THE INVENTION

This invention relates to a blends of polycarbonates with functionalized elastomers.

BACKGROUND

Polycarbonates have excellent mechanical properties, but are relatively brittle at low temperatures. U.S. Pat. No. 4,628,072 discloses the use of modified, hydrogenated block copolymers of styrene and conjugated diolefins as impact modifiers for polycarbonates. The block copolymers may be modified with a variety of acid groups or derivatives of the acid groups. The inclusion of acid or derivative functional groups on the block copolymers was generally considered to be necessary for the polycarbonates to have improved paint adhesion.

U.S. Pat. No. 4,578,429 describes modified block copolymers which may be grafted with a variety of acid groups or derivatives including hydroxy substituted acrylates such as hydroxyethylacrylate.

SUMMARY OF THE INVENTION

It has been discovered that the low temperature impact properties of polycarbonates are unexpectedly increased by addition of specific block copolymers which are grafted with hydroxyethylacrylate in comparison to other acid groups or derivatives. The toughened polycarbonate compositions of this invention comprise from 2 to 10 parts by weight of a modified block copolymer comprising at least one hydrogenated conjugated diolefin block and at least one vinyl aromatic block, and from 90 to 98 parts by weight of a polycarbonate, wherein the modified block copolymer comprises an effective amount of hydroxyethylacrylate to give the polycarbonate compositions a ⅛" notched Izod impact strength of 4.0 ft-lb/in or greater as determined by ASTM-D256 at −40° F.

DETAILED DESCRIPTION OF THE INVENTION

The polycarbonates used in the preparation of blends of this invention preferably have the general formula:

wherein n is sufficient to provide an engineering thermoplastic polymer and X comprises one or more phenylene or substituted phenylene groups which may be separated by a non-aromatic group such as alkyldiene, cycloalkyldiene, alkylene, cycloalkylene, azo, imino, sulfur, oxygen, sulfoxide, and sulfone. The substituted phenylene groups include alkyl, alkoxyl, halogen, and nitro substituted phenylene.

The preparation of polycarbonates is well known and commercially available polycarbonates are used in the examples. The most preferred polycarbonates have the formula

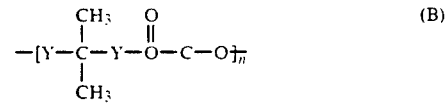

wherein Y is p-phenylene. The polycarbonates of formula B are prepared by reacting p,p'-isopropylidenediphenol with phosgene and are available from General Electric Company under the trademark LEXAN, from Mobay under the trademark MAKROLON, and from Dow under the trademark CALIBRE. Commercial polycarbonates typically have a molecular weight around 18,000 and a melt temperature above 230° C.

Polycarbonates which do not contain aromatic groups generally have lower service temperatures and are not preferred.

The modified block copolymers are produced by free radical grafting of a selectively hydrogenated block copolymer having a specific structure with hydroxyethylacrylate. The block copolymers generally have at least one vinyl aromatic block and at least one hydrogenated congugated diene block wherein the vinyl aromatic blocks phase separate into physically crosslinked domains. The hydrogenated conjugated diene blocks have a residual unsaturation less than 10% and a number average molecular weight between 10,000 and 1,000,000. The vinyl aromatic blocks have a number average molecular weight between 500 and 50,000. The block copolymer structure may be linear, radial, or branched.

Preferred block copolymers which may be used as precursors for the polymers of the present invention are described in U.S. Pat. No. 27,145 as styrenic block copolymers having a linear structure

A—B—A wherein each A is a vinyl aromatic block and B is a hydrogenated conjugated diene block. The preferred vinyl aromatic block is polystyrene and the preferred conjugated diene blocks are hydrogenated polybutadiene or hydrogenated polyisoprene. The hydrogenated polybutadiene or polyisoprene block has a residual unsaturation less than 2% and a number average molecular weight between 20,000 and 300,000. Each polystyrene block has a number average molecular weight between 2,000 and 30,000.

The hydroxyethylacrylate is grafted to the base block copolymer in an amount within the range from about 0.3 to about 10.0, preferably from about 0.5 to about 3.0, weight percent based on the modified block copolymer. Lower levels of functionality are ineffective in improving the low temperature toughness of the polycarbonates.

The base block copolymer may be functionalized using any of the free-radical grafting techniques known in the art for grafting functional groups to such polymers. For example, the modified, hydrogenated block copolymer may be prepared using solution processes such as those taught in U.S. Pat. Nos. 4,033,888; 4,077,893; and 4,670,173, which are incorporated herein by reference, or with melt-mixing processes such as those taught in U.S. Pat. Nos. 4,427,828; 4,578,429; and 4,628,072, which are incorporated herein by reference.

The compositions prepared according to the present invention may incorporate other components known in the art to be useful in polycarbonate compositions.

These other components include, for example, fillers, pigments, antioxidants, stabilizers, processing oils, extenders, mold release agents and the like.

When polycarbonate compositions are produced according to the present invention, the resultant compositions have an improved impact strength at −40° F. of at least 4.0 ft-lb/in as shown in the following examples.

Examples

Polycarbonate compositions were prepared by extruding a commercially available polycarbonate with selected block copolymers having a linear A—B—A structure.

MODIFIER PREPARATION

A styrene-hydrogenated butadiene-styrene (SEBS) block copolymer (A1) with number average block molecular weights of 7,500-35,000-7,500 was processed in a 133 mm ZSK Werner & Pfleiderer twin screw extruder equipped with two injection ports and a vacuum devolatilization unit. In the first injection port was added molten maleic anhydride (2.3% by weight based on the polymer feed rate). Through the second injection port was added a 50/50 mixture of mineral oil and 2,5-dimethyl-2,5-di(t-butylperoxy)hexane (Lupersol 101 from Pennwalt, 0.25% by weight based on polymer feed rate). The melt temperature of the polymer reached 280° C. and the extruder screw speed was 200 RPM. To prepare the polymer for analysis, the maleated block copolymer (B-1) was dissolved in tetrahydrofuran, coagulated into isopropanol, and then washed with water. The maleated polymer (B-1) sample was analyzed by acid/base titration, using a potassium methoxide solution and phenolthalien as an indicator, for bound maleic anhydride content. The polymer (B-1) was found to contain 1.8% by weight maleic anhydride.

The same styrene-hydrogenated butadiene-styrene (SEBS) block copolymer (A-1) was also processed on a 33 mm Werner & Pfleiderer twin screw extruder connected to a vacuum devolatilization unit. Prior to addition to the feed throat of the extruder, the polymer was tumbled with 3% by weight of 2-hydroxyethylacrylate (HEA) and 0.2% by weight of the peroxide (Lupersol 101). The melt temperature of the extruder was 243° C., and the extruder screw speed was 300 RPM. The HEA modified polymer (B-2) was analyzed via a saponification/titration method. The polymer (B-2) was dissolved in toluene at refluxing conditions. An excess of potassium hydroxide was added to cleave the ester group and allowed to react for two hours. The solution was then cooled to room temperature and an excess of acetic acid was added to the solution. The polymer was then coagulated with isopropanol and repeatedly washed with water until the water's pH was measured as neutral (6-7). The polymer (B-2) was then re-dissolved and titrated as described above. The polymer (B-2) was found to contain 0.9% w HEA bound to the polymer.

Blending with Polycarbonate (PC)

All three of the above described polymers (A-1, B-1, B-2) were blended at 5% by weight loading with a polycarbonate (PC) (Makrolon 2608 from Mobay) in a 33 mm Werner-Pfileiderer twin screw extruder. The extruder screw speed was 300 RPM and the melt temperature reached was from 305°-312° C. for the various blends. Pellets from each of the resulting blends and for the neat polycarbonate were injection molded into test specimens on a 25 ton/1.5 oz. Arburg injection molding machine. Each of the blends was tested for its impact strength (ASTM D-256) at room temperature (RT) and at low temperatures and tested for its flexural modulus (ASTM D-790). Table 1 gives the test results for the neat polycarbonate (PC) and each of the blends.

TABLE 1

| Sample ID | ⅛" Notched Izod (ft-lb/in) | | | Flex Mod (psi) |
| --- | --- | --- | --- | --- |
| | RT | −20° F. | −40° F. | |
| PC | 17.9 | 3.0 | 2.4 | 335,000 |
| PC + A-1 (5%) | 16.4 | 5.8 | 3.5 | 335,000 |
| PC + B-1 (5%) | 15.8 | — | 3.6 | 329,000 |
| PC + B-2 (5%) | 15.4 | 8.2 | 4.5 | 330,000 |

The results in Table 1 show that toughening of polycarbonate with an HEA modified block copolymer leads to improved low temperature impact strength in comparison to either the unmodified block copolymer (A-1) or the maleated block copolymer (B-1). This comparison is especially significant due to the low level of HEA grafted to the block copolymer (0.9 wt. %) in comparison to the higher level of maleic anhydride grafted to the block copolymer (1.8 wt. %).

I claim:

1. A toughened polycarbonate composition consisting essentially of:
   from 2 to 10 parts by weight of a modified block copolymer comprising at least one hydrogenated conjugated olefin block and at least one vinyl aromatic block; and
   from 90 to 98 parts by weight of a polycarbonate;
   wherein the modified block copolymer comprises from about 0.3 to about 10.0 percent by weight of hydroxyethylacrylate to give the polycarbonate composition a ⅛" notched Izod impact strength of 4.0 ft-lb/in or greater as determined by ASTM-D256 at −40° F.

2. The composition of claim 1, wherein the hydrogenated conjugated diene blocks have a number average molecular wight between 10,000 and 1,000,000 and the vinyl aromatic blocks have a number average molecular weight between 500 and 50,000.

3. The composition of claim 1, wherein the modified block copolymer is a polystyrene-hydrogenated polybutadienepolystyrene block copolymer that is free radically grafted with the hydroxyethylacrylate.

4. The composition of claim 1, wherein the modified block copolymer comprises from about 0.5 to about 3.0 percent by weight of the hydroxyethylacrylate based on the modified block copolymer.

5. The composition of claim 1, wherein the hydrogenated conjugated diene blocks have a residual unsaturation less than 10%.

6. A toughened polycarbonate composition consisting essentially of:
   from 2 to 10 parts by weight of a modified block copolymer comprising a structure of polystyrene-hydrogenated polybutadiene-polystyrene; and
   from 90 to 98 parts by weight of a polycarbonate;
   wherein the modified block copolymer comprises from about 0.3 to about 10.0 percent by weight of hydroxyethylacrylate to give the polycarbonate composition a ⅛" notched Izod impact strength of 4.0 ft-lb/in or greater as determined by ASTM-D256 at −40° F.

7. The composition of claim 6, wherein the hydrogenated polybutadiene block has a number average molecular weight between 20,000 and 300,000, and each polystyrene block has a number average molecular weight between 2,000 and 30,000.

8. The composition of claim 6, wherein the modified block copolymer is free radically grafted with the hydroxyethylacrylate.

9. The composition of claim 6, wherein the modified block copolymer comprises from about 0.5 to about 3.0 percent by weight of the hydroxyethylacrylate based on the modified block copolymer.

10. The composition of claim 6, wherein the hydrogenated polybutadiene blocks have a residual unsaturation less than 2%.

* * * * *